(12) United States Patent
Caracci et al.

(10) Patent No.: US 6,928,226 B2
(45) Date of Patent: Aug. 9, 2005

(54) FIBER AND LENS GRIPPERS, OPTICAL DEVICES AND METHODS OF MANUFACTURE

(75) Inventors: Stephen J. Caracci, Corning, NY (US); Adam J. Fusco, Painted Post, NY (US); Cheng-Chung Li, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 213 days.

(21) Appl. No.: 10/188,584

(22) Filed: Jul. 3, 2002

(65) Prior Publication Data

US 2003/0175000 A1 Sep. 18, 2003

Related U.S. Application Data

(60) Provisional application No. 60/364,470, filed on Mar. 14, 2002.

(51) Int. Cl.[7] .................................................. G02B 6/00
(52) U.S. Cl. ...................................... 385/137; 385/138
(58) Field of Search ................................ 385/137, 138, 385/52, 65, 83, 93, 114

(56) References Cited

U.S. PATENT DOCUMENTS

| | | | |
|---|---|---|---|
| 4,111,522 A | 9/1978 | Auracher et al. | 350/96 C |
| 4,497,536 A | 2/1985 | Payne et al. | 350/96.21 |
| 4,730,892 A | 3/1988 | Anderson et al. | 350/96.21 |
| 4,735,677 A | 4/1988 | Kawachi et al. | 156/633 |
| 4,750,799 A | 6/1988 | Kawachi et al. | 350/96.11 |
| 4,756,591 A | 7/1988 | Fischer et al. | 350/96.2 |
| 4,765,702 A | 8/1988 | Dohan et al. | 350/96.12 |
| 4,767,174 A | 8/1988 | Carenco et al. | 350/96.2 |
| 4,796,975 A | 1/1989 | Lukas et al. | 350/320 |
| 4,828,362 A | 5/1989 | Skinner et al. | 350/320 |
| 4,856,865 A | 8/1989 | Lee | 350/96.21 |
| 4,883,743 A | 11/1989 | Booth et al. | 430/321 |
| 4,969,705 A | 11/1990 | Stoy et al. | 350/96.21 |
| 4,973,126 A | 11/1990 | Degani et al. | 350/96.21 |
| 5,029,972 A | 7/1991 | Lukas et al. | 350/96.21 |
| 5,046,808 A | 9/1991 | Chang | 385/13 |
| 5,080,458 A | 1/1992 | Hockaday | 385/14 |
| 5,150,440 A | 9/1992 | Booth | 385/49 |
| 5,159,653 A | 10/1992 | Carpenter et al. | 385/95 |
| 5,239,601 A | 8/1993 | Denis et al. | 385/49 |

(Continued)

FOREIGN PATENT DOCUMENTS

| | | | |
|---|---|---|---|
| EP | 0 065 096 | 12/1985 | G02B/6/24 |
| EP | 0 290 253 | 1/1994 | G02B/6/255 |
| EP | 0 429 877 | 6/1995 | G02B/6/36 |
| EP | 1 124 148 | 8/2001 | G02B/6/32 |
| EP | 1 176 448 | 1/2002 | G02B/26/02 |
| JP | 58-072385 | 11/1984 | H01S/3/18 |
| JP | 59-101605 | 12/1984 | G02B/5/174 |
| JP | 02-157805 | 12/1988 | G02B/6/30 |
| WO | WO 87/05119 | 8/1987 | G02B/6/38 |
| WO | WO 91/13378 | 9/1991 | G02B/6/30 |
| WO | WO 95/06270 | 3/1995 | G02B/6/30 |

OTHER PUBLICATIONS

Patent Abstracts of Japan, vol. 1997, No. 11 Nov. 28, 1997, publication No. 09197195, publication date Jul. 31, 1997.

*Primary Examiner*—Daniel Stcyr
*Assistant Examiner*—Daniel A. Hess
(74) *Attorney, Agent, or Firm*—Timothy M. Schaeberle

(57) ABSTRACT

Articles and methods for positioning lensed fiber elements and optical devices are disclosed. The articles and methods include a lens gripping element and a fiber gripping element disposed on a planar substrate. The articles and methods are useful for manufacturing optical fiber and lens arrays and waveguide devices.

32 Claims, 6 Drawing Sheets

U.S. PATENT DOCUMENTS

| | | | |
|---|---|---|---|
| 5,243,673 A | 9/1993 | Johnson et al. | 385/90 |
| 5,311,604 A | 5/1994 | Rogner et al. | 385/14 |
| 5,359,687 A | 10/1994 | McFarland et al. | 385/49 |
| 5,420,688 A | 5/1995 | Farah | 438/31 |
| 5,559,918 A | 9/1996 | Furuyama et al. | 385/92 |
| 5,566,269 A * | 10/1996 | Eberle et al. | 385/137 |
| 5,891,747 A | 4/1999 | Farah | 438/31 |
| 6,266,472 B1 | 7/2001 | Norwood et al. | 385/137 |
| 6,282,351 B1 * | 8/2001 | Go et al. | 385/92 |
| 6,335,149 B1 | 1/2002 | Xu et al. | 430/321 |
| 6,353,698 B1 * | 3/2002 | Talamini, Sr. | 385/137 |
| 6,360,043 B1 | 3/2002 | Bostock et al. | 385/49 |
| 6,473,553 B1 | 10/2002 | Jerman et al. | 385/137 |
| 2003/0031409 A1 * | 2/2003 | Bellman et al. | 385/33 |
| 2003/0063889 A1 * | 4/2003 | Lavallee et al. | 385/137 |

* cited by examiner

FIBER AND LENS GRIPPERS, OPTICAL DEVICES AND METHODS OF MANUFACTURE

RELATED APPLICATIONS

This application claims the benefit of U.S. provisional patent application No. 60/364,470, filed on Mar. 14, 2002.

FIELD OF THE INVENTION

This invention relates to optical fiber and lens gripping articles. More particularly, the invention pertains to elastomeric gripping elements which can be used to position optical fibers and lenses in an array, optical waveguide devices and methods for manufacturing optical fiber and lens arrays and optical waveguide devices.

BACKGROUND OF THE INVENTION

Optical fibers have been the medium of choice in the field of optical communications for long distance propagation of light due to their excellent transmission characteristics and ability to be fabricated in lengths of many kilometers. Light propagates through the core region of optical fibers that can be as small as a few microns in diameter.

Optical fiber and lens arrays are used to couple light between optical fibers and optical devices in optical communication systems. Conventional optical fiber and lens arrays typically include an array of fibers arranged in a silicon v-groove positioning element, and the fiber ends are abutted to a lens array, which can be molded from an appropriate polymeric material. One limitation of this type of fiber and lens arrays is that since the lenses and fibers are separate elements, it is difficult to optimally align the core region of the optical fiber with the lens, which results in insertion loss.

Lensed optical fibers are devices that include a fiber having a lens formed on the end of the fiber. The assignee of the present invention manufactures lensed fibers under the OptiFocus™ product line, which includes lensed fibers for collimating, focusing, imaging and condensing light. One type of OptiFocus™ lensed optical fiber includes monolithic devices that comprise a lens having a lens end portion attached to an end portion of a fiber. Some lensed fibers include a neck portion surrounding and end portion of the fiber, and the diameter of the neck portion of the lens is greater than the diameter of the fiber.

Examples of specific types of lensed fibers include, but are not limited to, collimating lensed fibers, focusing lensed fibers and tapered lensed fibers. Collimating lensed fibers are up to four times smaller than typical fiber-lens devices, and lensed fibers do not require any alignment of the lens to the fiber. Focusing lensed fibers are capable of focusing light beam sizes down to about six microns, with long working distances. Tapered lensed fibers include a high precision, tapered lens for high numerical aperture applications with short working distances.

To take advantage of the desirable performance characteristics of lensed optical fibers, methods and apparatus are needed to precisely align lensed optical fibers to form an array. One available technology is silicon V-grooves, which are used as fiber positioning elements. V-grooves are formed in a pair of upper and lower silicon substrates and fibers are placed in these grooves. The upper and lower substrates sandwich the fibers and hold the fibers in the grooves. However, V-groove devices have several limitations. For example, once a V-groove is fabricated, it serves to position the optical fiber only relative to the silicon substrate. The end of the fiber, which includes the lens, must still be positioned relative to other optical elements in the system. Such positioning is usually accomplished by micromanipulation and use of adhesives after micropositioning, which is expensive and time-consuming, especially in a mass production manufacturing environment. Another limitation of V-grooves for positioning lensed fibers is that the V-groove is sized to hold the fiber, but the V-groove is too small to hold the lens portion of the lensed fiber. An alignment method and apparatus is needed to hold both the fiber portion and the lens portion of the lensed fiber in position.

It would be desirable to provide alignment methods and apparatus for lensed optical fibers capable of aligning both the fiber portion of the lensed optical fiber and the lens portion of the fiber. Furthermore, there is a need to provide alignment methods and apparatus that do not require adhesives or thermal heat treatments and do not require complex manufacturing steps or elaborate micromanipulation to achieve alignment of the lensed optical fibers. Such alignment methods and articles would facilitate the manufacture of a wide variety of optical devices.

SUMMARY

The various embodiments of the invention relate to methods and articles for positioning arrays of lenses and optical fibers, lensed optical fibers and optical devices including such arrays. One embodiment of the invention relates to an article for positioning a lensed optical fiber including an optical fiber portion and a lens portion. This embodiment includes a fiber gripping element on a substrate, and the gripping element includes a pair of elastomeric side walls defining a groove between the sidewalls sized to hold the optical fiber portion of the lensed optical fiber. This embodiment further includes a lens gripping element on the substrate, and the lens gripping element includes a pair of elastomeric side walls defining a groove between the sidewalls sized to hold the lens portion of the lensed optical fiber. In certain embodiments, the lens portion further includes a neck and a convex shaped end and the lens gripping element is sized to hold the neck. In other embodiments, the elastomeric sidewalls of the lens gripping element and the fiber gripping element are manufactured from materials including a polymer.

In some embodiments, the sidewalls of the lens gripping element are generally parallel and the sidewalls of the fiber gripping element are generally parallel. In other embodiments, the article includes a plurality of lens gripping elements and a plurality of fiber gripping elements, and the plurality of fiber gripping elements are generally disposed in a parallel arrangement on the surface of the substrate and the fiber gripping elements and the lens gripping elements are generally disposed in a collinear arrangement on the substrate. In still other embodiments, the optical fiber includes a coated portion, the fiber gripping element is sized to grip the coated portion of the fiber, and the lens gripping element is substantially coplanar with the fiber gripping element. In some embodiments, the substrate includes an upper planar surface and a lower planar surface, and the fiber gripping element is disposed on the upper planar surface and the lens gripping element is disposed on the lower planar surface. In other embodiments, the substrate includes at least three planar surfaces, wherein the fiber gripping element is disposed on an upper planar surface, the lens gripping element is disposed on an intermediate planar surface and the convex shaped end of the lens is disposed over a lower planar surface.

Other embodiments of the invention relate to positioning a lensed fiber including a lens portion and a fiber portion. One embodiment involves disposing at least one fiber gripping element on a substrate, the fiber gripping element including a pair of elastomeric side walls defining a groove between the sidewalls sized to hold the optical fiber portion of the lensed optical fiber. This embodiment further includes disposing a lens gripping element on the substrate, the lens gripping element including a pair of elastomeric side walls defining a groove between the side walls sized to hold the lens portion of the lensed optical fiber. This embodiment also includes positioning the fiber portion of the lensed fiber within the fiber gripping element and positioning lens portion of the lensed fiber within the lens gripping element. In preferred embodiments, the lens portions further include a neck portion and a convex-shaped end and the neck portion is positioned within the lens gripping element. If an array of lenses and fibers is desired, certain embodiments involve disposing a plurality of fiber gripping elements in a generally parallel arrangement on the surface of the substrate and a plurality of lens gripping elements in a collinear arrangement with the fiber gripping elements.

A method of providing lens and fiber arrays may further include positioning a plurality of lensed fibers in the gripping elements, wherein the fiber portions of the lensed fibers are positioned within the fiber gripping elements and the lens portions are disposed within the lens gripping elements to provide an array of lensed optical fibers. In some embodiments, the substrate includes an upper surface and a lower surface and the fiber gripping elements are disposed on the upper surface and the lens gripping elements are disposed on the lower surface. The optical fiber may include a coated portion in certain embodiments, and the fiber gripping elements are sized to hold the coated portion of the fiber. In still other embodiments, the substrate includes and upper surface, an intermediate surface and a lower surface, wherein the fiber gripping elements are disposed on the upper surface and the lens gripping elements are disposed on the intermediate surface.

Other embodiments of the invention relate to forming an optical waveguide device which can include positioning a plurality of optical fibers in a generally parallel relationship within a plurality of elastomeric fiber gripping elements disposed on a substrate. Forming an optical waveguide device may further include positioning a plurality of lens elements in a generally parallel relationship within a plurality of elastomeric lens gripping elements disposed on a substrate such that the lens elements and the optical fibers are generally collinear and are arranged to provide a plurality of optical paths for transmitting light. It may be desirable in some embodiments to place an optical element such as an optical filter or polarizer in the optical paths.

Still other embodiments of the invention relate to optical waveguide devices which can include a plurality of optical fibers disposed in a generally parallel relationship within elastomeric fiber gripping elements disposed on a substrate and a plurality of lens elements disposed in a generally parallel relationship within elastomeric lens gripping elements disposed on a substrate such that the lens elements and the optical fibers are generally collinear and are arranged to provide a plurality of optical paths for transmitting light. In some embodiments, the substrate includes an upper surface and a lower surface and the fiber gripping elements are disposed on the upper surface and the lens gripping elements are disposed on the lower surface. In certain embodiments, the lens elements include neck portions and convex-shaped end portions and the lens gripping elements are sized to receive the neck portions.

Another embodiment of the invention relates to an optical device including a plurality of lensed optical fibers arranged on a substrate, the lensed fibers including lens portions and fiber portions. In this embodiment, the lens portions are arranged in a linear pattern. Preferably, flexible gripping elements hold the fiber portions to a substrate. In certain embodiments, the flexible gripping elements include elastomeric fiber gripping elements on the substrate for holding the fibers in place.

In another embodiment, the lensed optical fibers include a light path directed towards a centrally located optical element. In certain embodiments, the optical element is capable of redirecting light between different lensed fibers in the array. Suitable elements for redirecting light, include, but are not limited to MEMs mirrors, liquid crystal switches, electroholographic switches and prisms. In other embodiments, linear arrays of lensed fibers are secured to a substrate by flexible gripping elements so that the lensed fibers are in an opposing relationship and at least a portion of the fibers opposing each other have light paths that are aligned so that light can transmit from one array to the opposing array.

The present invention provides relatively simple and inexpensive methods and articles for positioning lensed optical fiber elements and arrays of lensed optical fiber elements in an array. The methods and articles do not require adhesives or expensive micropositioning of the fibers. In addition, the methods and apparatus can precisely position and hold both the lens portion and the fiber portion of lensed optical fibers.

Other embodiments relate to optical devices including a lens element secured to a substrate by a flexible gripping element, a ferrule adjacent the lens element and secured to the substrate by a flexible gripping element, and an optical fiber secured to the ferrule. In certain embodiments, the lens and ferrule are generally cylindrical in shape, and in other embodiments, the lens is a gradient index lens.

It is to be understood that both the foregoing general description and the following detailed description are exemplary and are intended to provide further explanation of the invention as claimed.

DETAILED DESCRIPTION

Before describing several exemplary embodiments of the invention, it is to be understood that the invention is not limited to the details of construction or process steps set forth in the following description. The invention is capable of other embodiments and of being practiced or carried out in various ways.

The various embodiments of the present invention provide methods and articles for positioning lenses and fibers and lensed fibers in arrays. As used herein, the term "lensed fiber" refers to an optical fiber that includes lens formed on at least one end of the fiber. The lens includes generally cylindrical neck portion attached to or surrounding an end portion of the fiber and a lens portion or lens surface. The lens portion or lens surface can be a variety of shapes, but in preferred embodiments, the lens surface is convex-shaped. The methods and articles of the present invention are useful for making optical waveguide devices includes arrays of optical fibers and other optical elements that include but are not limited to prisms, switches, waveguides, filters and polarizers. The positioning elements for the lenses and the fibers and other optical elements can all be arranged on a common substrate.

U.S. Pat. Nos. 6,266,472 and 5,359,687, both of which are incorporated herein by reference, describe polymer microstructures and methods of manufacturing such microstructures for gripping optical fibers. In U.S. Pat. No. 5,359,687, the polymer microstructures formed on a substrate are used to grip optical fibers and position these fibers with respect to a waveguide disposed on the substrate. U.S. Pat. No. 6,266,472 discloses polymer gripping elements that are used in splicing optical fibers.

While the gripping devices disclosed in U.S. Pat. Nos. 5,359,687 and 6,266,472 are suitable for gripping optical fibers not physically connected to any other elements, lensed fibers require further stabilization to securely hold and align the lens portion of a lensed fiber. Certain embodiments of the present are capable of holding and precisely aligning both the fiber portion and the lens portion of individual lensed fibers in arrays, enabling the production of a wide variety of optical devices. Other embodiments relate to devices for holding lenses and ferrules aligned with optical fibers.

Figure 1:
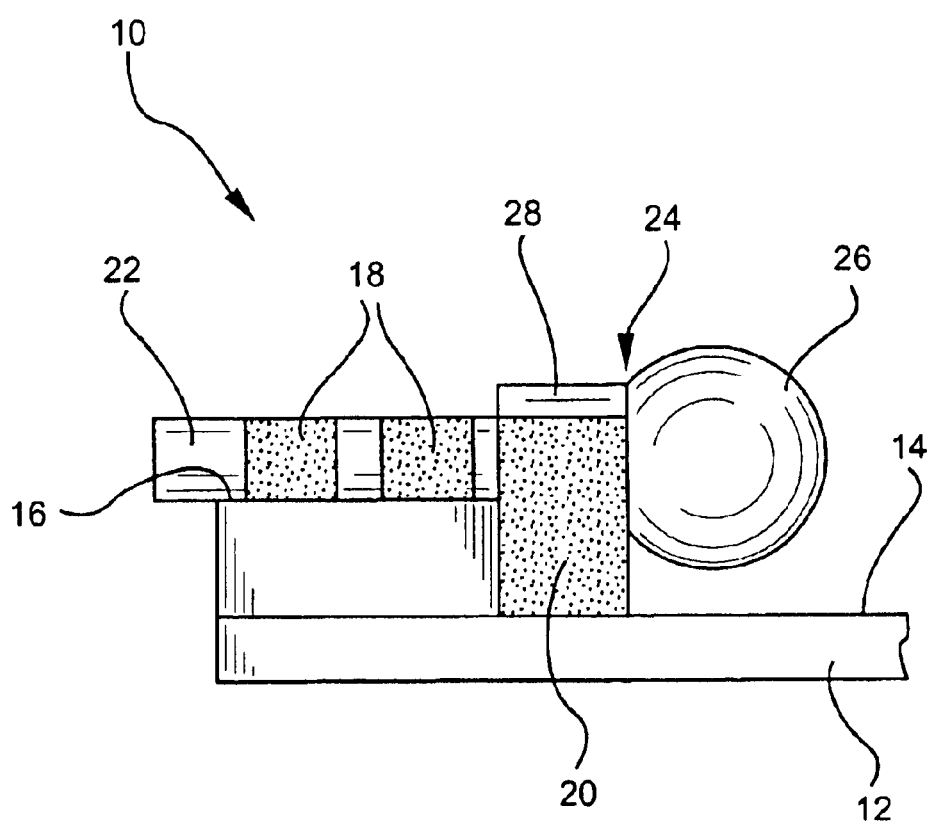
FIG. 1 is a side view of a substrate including fiber and lens gripping elements holding a lensed fiber.
Figure 2:
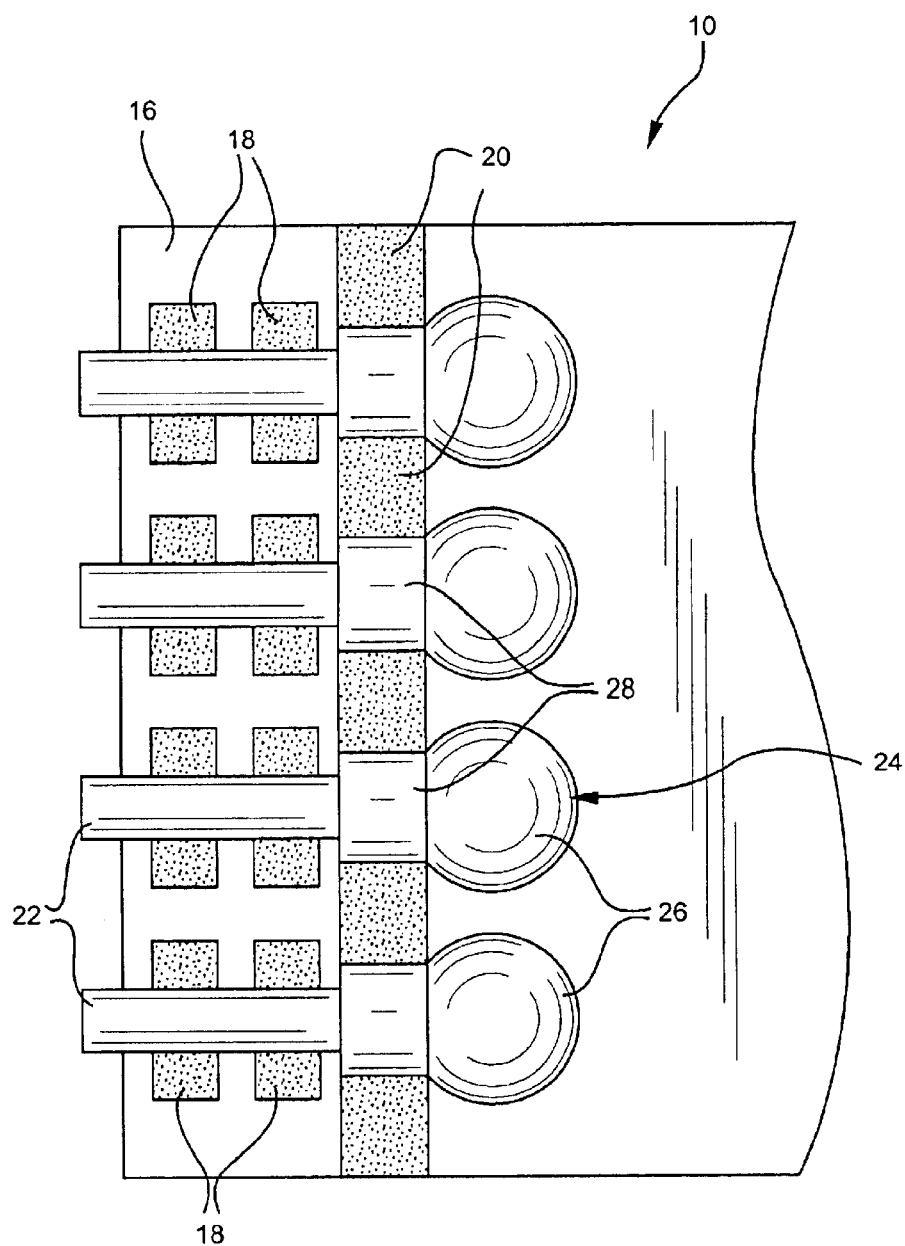
FIG. 2 is a top view of an array of lensed fibers held in place on a substrate including fiber gripping elements and lens gripping elements.

Referring to FIGS. 1 and 2, a fiber and lens gripping article 10 is shown and includes a substrate 12. The substrate 12 can be made from a variety of materials including but not limited to glass, silicon, ceramics and plastics. The substrate 12 preferably includes a stepped feature including a lower surface 14 and an upper surface 16. Preferably, the upper surface 16 and the lower surface 16 are planar surfaces. At least one fiber gripping element 18, and preferably a plurality of fiber gripping elements 18 are positioned on the upper surface 16 of the substrate 12. At least one lens gripping element 20, and preferably a plurality of lens gripping elements are provided on the lower surface 14 of the substrate. The lens griping element 20 and the fiber gripping element 18 are preferably arranged collinearly on the substrate 12.

The fiber gripping elements 18 are sized to firmly hold an optical fiber 22 in position on the substrate. The lens gripping elements 20 are sized to firmly hold a lens 24 in place on the substrate. Preferably, the lens 24 includes a convex shaped portion or surface 26 and a neck portion 28 and is formed on an end of the optical fiber 22. It will be understood, however, that the shaped of the lens does not have to be convex and other lens shapes are within the scope of the invention. The neck portion 28 of the lens has a diameter that is greater than the diameter of the optical fiber lens. The step feature on the substrate 12 provides the upper surface 16 for the fiber to rest on. The lower surface 14 provides a surface for the lens neck to rest on. The upper surface 16 can be made from the same material as the lower surface 14. Steps can be formed on the substrate by removing a portion of the lower surface 12 of the substrate by techniques including but not limited to grinding or etching such as reactive ion etching. Alternatively, steps can be provided by laminating, injection molding, lithography or printing the step to provide an upper surface 16 on the substrate 12. If the step and upper surface are provided in this manner, the step and upper surface 16 may be made from a material that is different than the material that makes up the lower surface 14.

Figure 3:
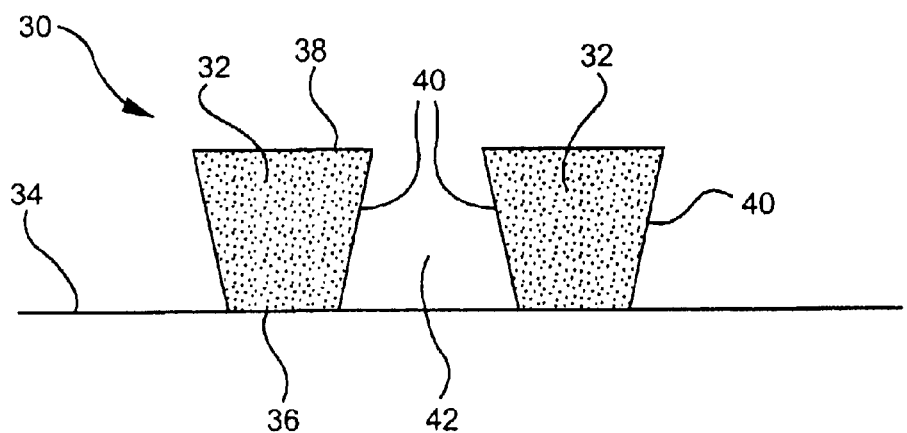
FIG. 3 is an edge view of a gripping element.

FIG. 3 shows a gripping element 30 in more detail, and it will be understood that the details of the gripping element shown in FIG. 3 pertain to fiber gripping elements and lens gripping elements, except for the differences noted below. The gripping element 30 includes laterally spaced elastomeric strips 32 attached to the surface of a substrate 34. Each of the elastomeric strips has a base portion 36 attached to a surface of the substrate 34, a top surface 38 which is preferably substantially parallel with the surface of the substrate 34 and side walls 40 which provide a groove 42 between the strips 32. A portion of the substrate 34 forms a floor of the groove 42.

Figure 4:
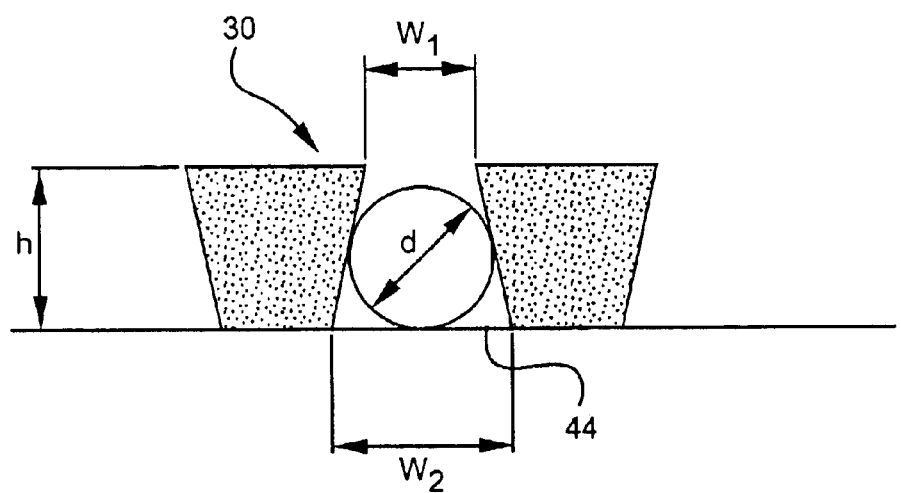
FIG. 4 is an edge view of a gripping element including an optical fiber disposed between a groove of the gripping element.

Referring now to FIG. 4, a portion of the substrate surface forms a floor 44 for the gripping element so that the groove has a width near the floor $w_2$ that is greater than the width $w_1$ at the top of the groove. Preferably, to adequately grip the surface of a fiber or a neck area of a lens, the width $w_1$ at the top of the groove is less than the diameter d of the fiber or the neck area of the lens. The width $w_2$ at the bottom of the groove is preferably greater than the diameter d of the lens neck or the fiber. It will be understood that fibers having a larger diameter, for example coated fibers versus uncoated fiber, will require a larger groove to accept insertion of the fiber and to hold the fiber in place vertically and horizontally along its axis. In addition, the neck area of the lens will generally have a larger diameter than the fiber, and therefore the lens grippers will generally have a larger groove width than the fiber grippers. The sidewalls of each strip should be sufficiently flat so that each strip contacts the fiber or neck portion of the lens at least at one point so that the gripper exerts a force on the fiber or lens neck generally perpendicular to the fiber axis. U.S. Pat. No. 5,359,687 contains additional details on particular dimensions for common telecommunications fibers.

The strips that make up the gripping elements are formed using well-known lithographic processes using photopolymerizable compositions and the like. For example, a photopolymerizable composition can be substantially uniformly deposited on onto a substrate surface. The photopolymerizable composition is then imagewise exposed to actinic radiation using a laser and a computer-controlled stage to expose precise areas of the composition with an ultraviolet laser beam, or a collimated UV lamp together with a photomask having a pattern of substantially transparent and substantially opaque areas. The nonimaged areas can then be removed with solvent, while leaving the imaged areas in the form of at least one gripping element on the substrate surface.

Alternatively, elastomeric strips can be formed by using a soft, flexible embossing tool to pattern the polymerizable composition in the form of at least one gripping element on the substrate surface. Such soft tooling is commonly made with silicones. The composition is then cured and the tool is removed. The flexibility of the tool must be sufficient so that it can be removed from the cured polymer without damaging the grippers. The polymerizable composition may be cured by various means such as actinic radiation or heat, and should have the viscosity to conform to the raised features of the tool. After removing the tool from the cured composition, at least one gripping element will remain on the substrate, depending on the nature of the pattern. The pattern of the tool may include a plurality of gripping elements to provide a substrate for aligning an array of fiber and lenses. Suitable polymeric compositions for making the gripping elements are disclosed in commonly assigned U.S. Pat. No. 6,266,472.

Figure 5:
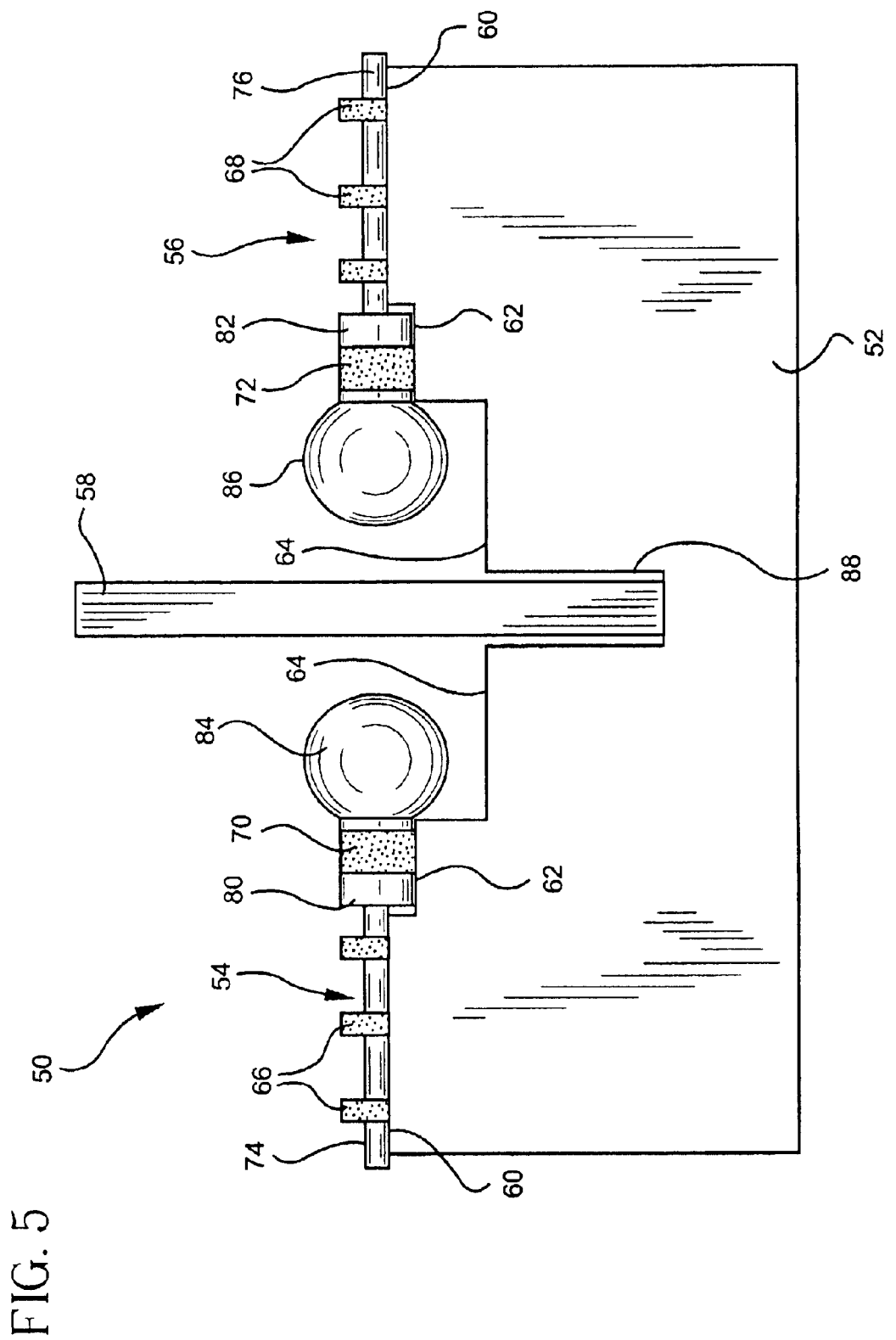
FIG. 5 is a side view of an optical device including opposing lensed optical fibers held in place by fiber gripping elements and lens gripping elements.
Figure 6:
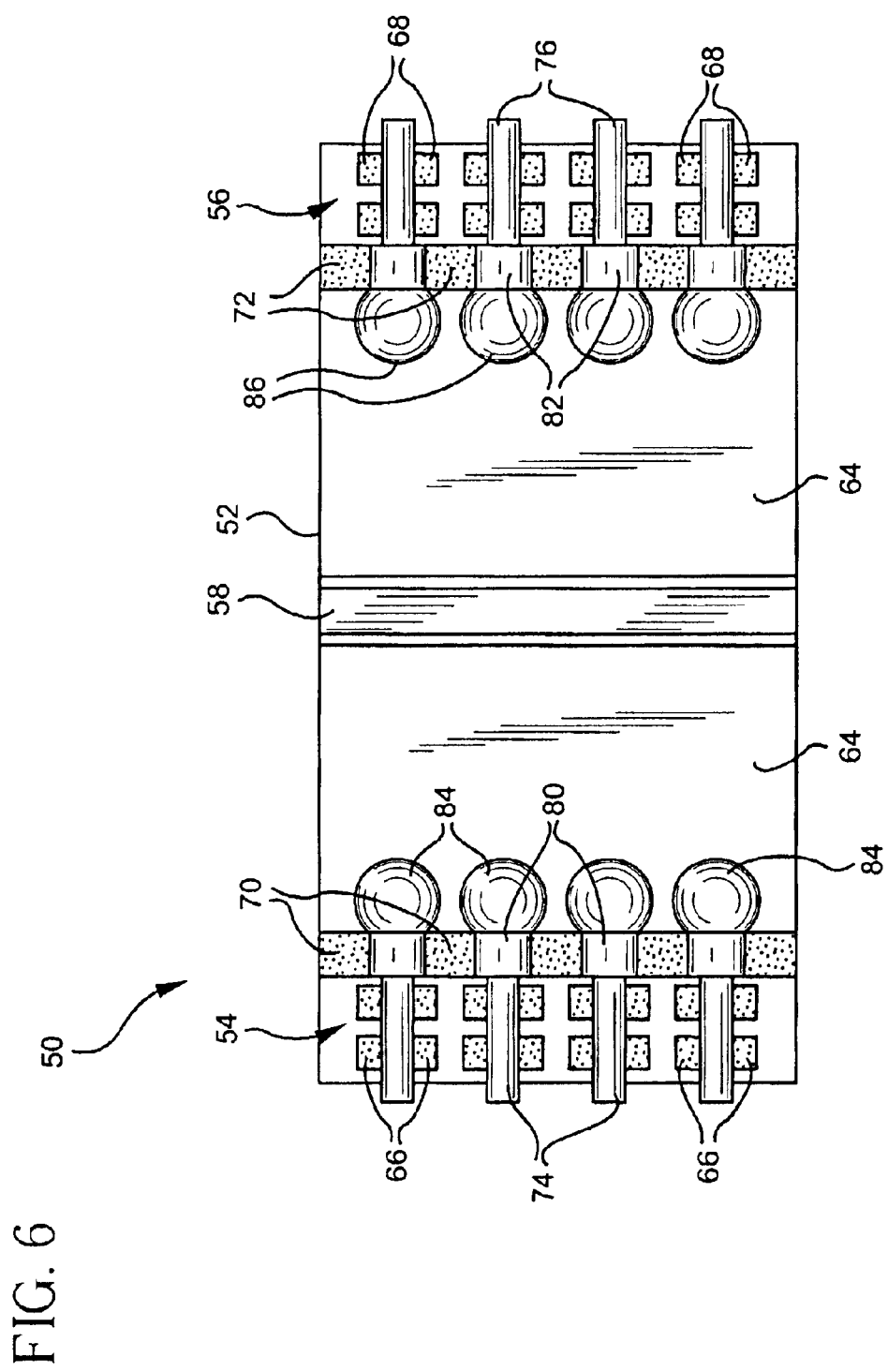
FIG. 6 is a top view of an optical device including two arrays of lensed optical fibers positioned on a substrate and having a filter disposed between the arrays.

The various embodiments of the present invention provide a convenient alternative to V-groove technology for positioning fiber and lens arrays. The fibers and lenses are positioned over their respective gripping elements formed on a substrate and inserted into the gripping elements. The articles and methods are useful for positioning opposing arrays of lensed fibers having optical components such as filters and polarizers disposed between the opposing arrays. The opposing arrays as well as the optical components can be positioned on a common substrate. Referring to FIGS. 5 and 6, and optical device 50 is shown, which includes a substrate 52, a first array of lensed fibers 54, a second array of lensed fibers 56 placed in an opposing relationship with the first array of lensed fibers 54, and a filter 58 disposed between the opposing arrays. The substrate 52 includes an upper surface 60, an intermediate surface 62 and a lower surface 64. Fiber gripping elements 66 and 68 are disposed on the upper surface 60, and lens gripping elements 70 and 72 are disposed on the intermediate surface 62. The fiber gripping elements 66 and 68 are sized to grip optical fibers 74 and 76. In the embodiment shown in FIGS. 5 and 6, the fiber gripping elements 66 and 68 are sized to grip an uncoated optical fiber, however, it will be understood that the size of the fiber gripping elements 66 and 68 and the groove between the gripping elements can be enlarged to grip a coated optical fiber. The lens gripping elements 70 and 72 are sized to grip the neck portions 80 and 82 of lenses 84 and 86. The filter 58 is disposed in a slot 88 formed in the substrate 52.

One example of a process for manufacturing optical devices as shown in FIGS. 5 and 6 includes forming a multistep substrate with an embossing tool or by removing portions of a substrate by techniques such as etching or grinding. The substrate surfaces on which gripping elements are formed are prepared with an adhesion promoter to enhance bonding of the gripping elements to the substrate surface. The gripping elements are formed on the surfaces of the substrate with an embossing tool or photomask and cured with actinic radiation or heat as described in U.S. Pat. No. 6,266,472. The gripping elements should be flexible enough to provide enough elastic strength to deform under applied stress when the fibers of lens necks are inserted into the grooves of the gripping elements. A slot is then provided in the substrate by using a saw or laser. A filter, a mirror, an attenuator, a modulator, a grating, a polarizer, a switch such as a liquid crystal switch or other optical device is placed in the slot and held in place by an adhesive. If a switching element such as a liquid crystal switch is used as the optical element, the light passing from one array of optical fibers can divert a signal beam from one individual fibers in one array to a fiber in the other array that is not collinear or in line with the fiber in the other array. Lensed optical fibers are then inserted into the gripping elements to form an array of fibers. The fibers are inserted in the fiber gripping elements and the lens neck portions are inserted in the lens gripping elements.

The use of elastomeric gripping elements to position lenses and lensed fibers in an array enables the provision of a wide variety of array configurations. Silicon v-groove technology limits the number of configurations that can be used to position fibers and fiber and lenses in an array because silicon v-grooves are constrained by the crystallographic planes of the material to achieve the v-shaped grooves in a silicon substrate. The v-grooves can only be formed in a parallel configuration. The gripping elements of the present invention allows for greater flexibility in providing a wider variety of fiber arrangements.

Figure 7:
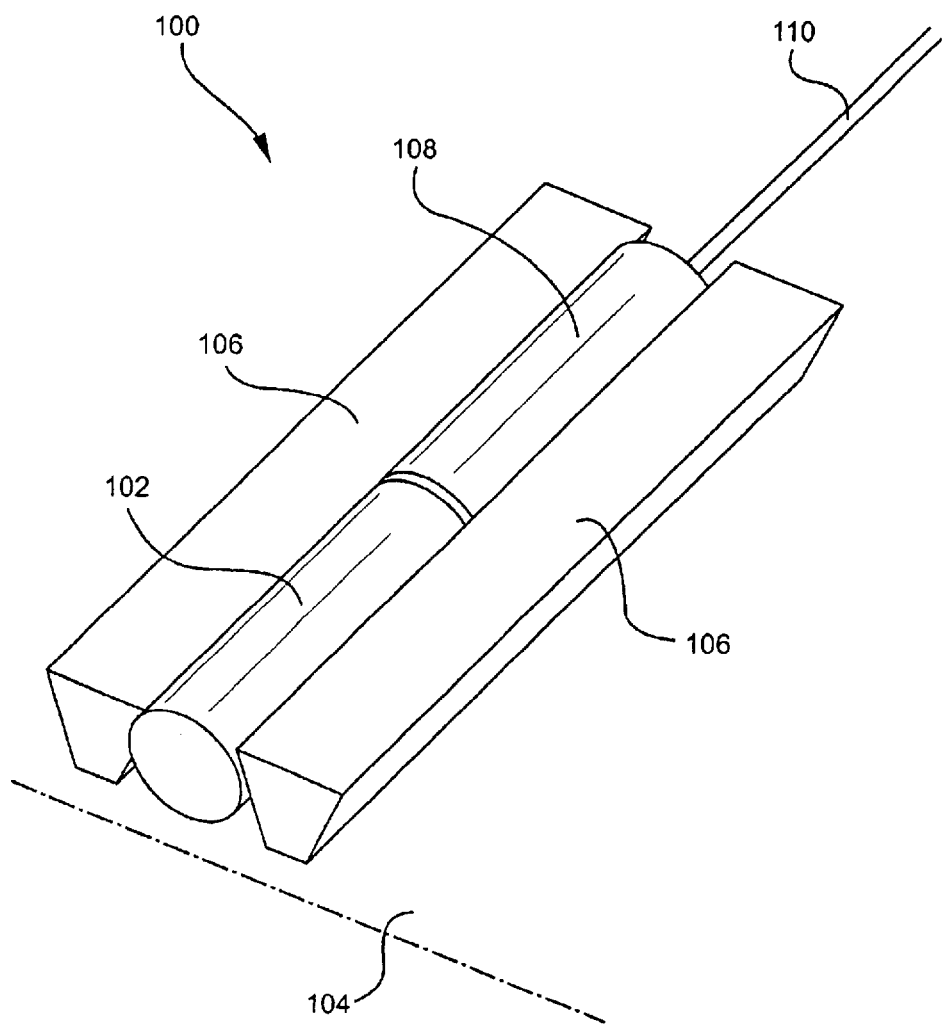
FIG. 7 is a perspective view of an optical device including a lens and a ferrule secured to a substrate by a gripping element and aligned with an optical fiber.

According to another embodiment of the invention shown in FIG. 7, an optical device 100 can be provided by securing a lens element 102 to a substrate 104. A gripping element 106 deposited on the substrate secures the lens element 102 to the substrate. A ferrule 108 is also secured to the substrate 104 by the gripping element 106, and the ferrule 108 is used to align optical fiber 110 with the lens element 102. The figure shows the lens element 102 and the ferrule 108 secured to the substrate 104 by a common gripping element 106. However, in other embodiments, it may be desirable to provide separate gripping elements for the lens element 102 and the ferrule 108. In addition, it may be desirable to provide a gripping element (not shown) to secure the fiber 108 to the substrate. The lens element 102 may be generally cylindrical in shape as shown in FIG. 7, and an example of a type of lens that can be used includes a gradient index (GRIN) lens. The ferrule 108 can also be generally cylindrical in shape.

The device 100 shown in FIG. 7 can be assembled by inserting a lens element 102 in a channel 107 provided by gripping element 106. Gripping elements would be fabricated with a height and opening of appropriate in size for the size of the ferrule 108 and lens element 102. In preferred embodiments the gripping elements include a pair of trapezoidally shaped members spaced apart to provide the channel 107. The channel 107 has a smaller opening near the top portion than near the bottom portion attached to the substrate. For example, a 1.8 mm diameter lens element would use a gripper height of approximately 1.8 mm and an upper channel spacing of approximately 1.65 mm. The fiber 110 is inserted into the ferrule 108, which is typically made from a glass or ceramic material, in a conventional manner. Typically, the ferrule has an opening therein and the fiber is inserted into the ferrule, glued in with an adhesive, and then polished with a slight endface angle to reduce back reflections. The lens element 102 could then be inserted, followed by the insertion of the fiber ferrule 108 and fiber 110. An adhesive could optionally be applied to increase pull strength. The use of gripping elements to secure the lens element and ferrule to the substrate is advantageous in that the lens and ferrule can be aligned and assembled more readily and inexpensively than in conventional manufacturing methods. In prior art methods, typically, the lens and ferrule are inserted into a metallic outer sleeve and glued into place. According to some embodiments of the present invention, thermal effects from using dissimilar materials for the lenses and sleeve components are eliminated.

In addition, by using the gripping elements of the present invention, an array of lenses, ferrules and fibers can be provided by securing the elements to the substrate in a plurality of gripping elements in either a generally parallel arrangement or in a curvilinear or radial pattern. According to certain embodiments, arrays of GRIN lenses can be manufactured on small center to center spacing.

It will, be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. An article for positioning a lensed optical fiber including an optical fiber portion and a lens portion comprising:

a substrate a fiber gripping element on the substrate, the fiber gripping element including a pair of elastomeric side walls defining a fiber groove therebetween sized to hold the optical fiber portion of the lensed optical fiber; and a lens gripping element on the substrate that is non-contiguous with the fiber gripping element, the lens gripping element including a pair of elastomeric side walls defining a lens groove therebetween sized to hold the lens portion of the lensed optical fiber, the lens groove having a width at a base of the side walls that is larger than a diameter of the lens portion and a width at a top of the side walls that is smaller than the diameter of the lens portion.

2. The article of claim 1, wherein the lens portion further includes a neck portion and a convex-shaped end portion and the lens groove is sized to hold the neck portion.

3. The article of claim 1, wherein the elastomeric sidewalls of the lens gripping element and the fiber gripping element are comprised of a polymer.

4. The article of claim 3, wherein the sidewalls of the lens gripping element are generally parallel and the sidewalls of the fiber gripping element are generally parallel.

5. The article of claim 1, wherein the article includes a plurality of lens gripping elements and a plurality of fiber gripping elements, wherein the plurality of fiber gripping elements are generally disposed in a parallel arrangement on a surface of the substrate and the fiber gripping elements and the lens gripping elements are generally disposed in a collinear arrangement on the substrate.

6. The article of claim 1, wherein the optical fiber includes a coated portion, the fiber gripping element is sized to grip the fiber coated portion, and the lens gripping element is substantially coplanar with the fiber gripping element.

7. The article of claim 1, wherein the substrate includes an upper planar surface and a lower planar surface and the fiber gripping element is disposed on the upper planar surface and the lens gripping element is disposed on the lower planar surface.

8. The article of claim 1, wherein the substrate includes at least three planar surfaces, wherein the fiber gripping element is disposed on an upper planar surface, the lens gripping element is disposed on an intermediate planar surface, and the a curved end of the lens is disposed over a lower planar surface.

9. A method of positioning a lensed fiber including a lens portion and a fiber portion comprising:

positioning a fiber portion of the lensed fiber in a fiber gripping element on a substrate, the fiber gripping element including a pair of elastomeric side walls defining a fiber groove therebetween sized to hold the fiber portion of the lensed fiber; and positioning a lens portion of the lensed fiber in a lens gripping element on the substrate that is non-contiguous with the fiber gripping element, the lens gripping element including a pair of elastomeric side walls defining a lens groove therebetween sized to hold the lens portion of the lensed fiber, the lens groove having a width at a base of the side walls that is larger than a diameter of the lens portion and a width at a top of the side walls that is smaller than the diameter of the lens portion.

10. The method of claim 9, wherein the lens portions further includes a neck portion and a convex-shaped end portion and the neck portion is positioned within the lens groove.

11. The method of claim 10, wherein the substrate includes an upper surface and a lower surface and the fiber gripping elements are disposed on the upper surface and the lens gripping elements are disposed on the lower surface.

12. The method of claim 11, wherein the optical fiber includes a coated portion and the fiber gripping elements are sized to hold the coated portion of the fiber.

13. The method of claim 10, wherein the substrate includes an upper surface, an intermediate surface and a lower surface, wherein the fiber gripping elements are disposed on the upper surface and the lens gripping elements are disposed on the intermediate surface.

14. The method of claim 9, further including disposing a plurality of fiber gripping elements in a generally parallel arrangement on the surface of the substrate and a plurality of lens gripping elements in a collinear arrangement with the fiber gripping elements.

15. The method of claim 14, further including positioning a plurality of lensed fibers in the gripping elements, wherein the fiber portions of the lensed fibers are positioned within the fiber gripping elements and the lens portions are disposed within the lens gripping elements to provide an array of lensed optical fibers.

16. A method of forming an optical waveguide device comprising;

securing a plurality of optical fibers in a generally parallel relationship within a plurality of elastomeric fiber gripping elements disposed on a substrate; and securing a plurality of lens elements in a generally parallel relationship within a plurality of elastomeric lens gripping elements disposed on a substrate such that the lens elements and the optical fibers are generally collinear and are arranged to provide a plurality of optical paths for transmitting light, the lens gripping elements being non-contiguous with the fiber grinning elements, each lens gripping element having a lens groove for receiving the lens elements, the lens groove having a width at a base of the lens gripping element that is larger than a diameter of the lens element and a width at a top of the lens gripping element that is smaller than the diameter of the lens element.

17. The method of claim 16, further comprising disposing an optical element in the optical paths.

18. The method of claim 17, wherein the optical element includes an optical filter.

19. The method of claim 17, wherein the optical element is selected from the group consisting of a polarizer, a switch, a modulator and an attenuator.

20. An optical waveguide device comprising:

a plurality of optical fibers disposed in a generally parallel relationship within elastomeric fiber gripping elements disposed on a substrate; and a plurality of lens elements disposed in a generally parallel relationship within elastomeric lens gripping elements disposed on a substrate such that the lens elements and the optical fibers are generally collinear and are arranged to provide a plurality of optical paths for transmitting light, the lens gripping elements being non-contiguous with the fiber gripping elements, each lens gripping element defining a lens groove for receiving a lens element, the lens groove having a width at a base of the lens gripping element that is larger than a diameter of the lens element and a width at a top of the lens gripping element that is smaller than the diameter of the lens element.

21. The optical waveguide device of claim 20, wherein the substrate includes an upper surface and a lower surface and the fiber gripping elements are disposed on the upper surface and the lens gripping elements are disposed on the lower surface.

22. The optical waveguide device of claim 20, wherein the lens elements include neck portions and convex-shaped end portions and the lens gripping elements are sized to receive the neck portions.

23. The optical waveguide device of claim 22, wherein the substrate includes an upper surface, an intermediate surface and a lower surface, and wherein the fiber gripping elements are disposed on the upper surface, the lens gripping elements are disposed on the intermediate surface, and the convex shaped end portions of the lens elements are disposed over the lower surface.

24. The optical waveguide device of claim 20, further including a filter disposed in the optical paths.

25. The optical waveguide device of claim 20, further including a polarizer disposed in the optical paths.

26. The optical waveguide device of claim 20, further comprising a switch disposed in the optical paths.

27. An optical device comprising a plurality of lensed optical fibers secured on a substrate by a plurality of flexible gripping elements, the lensed fibers including lens portions and fiber portions, wherein the lens portions are arranged in a linear pattern such that the fiber portions are substantially parallel to each other,
the gripping elements including a fiber gripping element on the substrate, the fiber gripping element including a pair of elastomeric side walls defining a fiber groove there between sized to hold the optical fiber portion of the tensed optical fiber; and
a lens gripping element on the substrate that is non-contiguous with the fiber gripping element, the lens gripping element including a pair of elastomeric side walls defining a lens groove there between sized to hold the lens portion of the lensed optical fibers the lens groove having a width at a base of the side walls that is larger than a diameter of the lens portion and a width at a top of the side walls that is smaller than the diameter of the lens portion.

28. The optical device of claim 27, wherein the lensed optical fibers include lights paths directed towards an optical element.

29. The optical device of claim 28, wherein the optical element is capable of redirecting light between different lensed fibers in the array.

30. The optical device of claim 29, wherein the optical element is selected from the group consisting of a MEMs mirror, a liquid crystal switch, an electroholographic switch and a prism.

31. The optical device of claim 28, further including an array of lensed optical fibers having light paths, the array of lensed fibers disposed in an opposing relationship with the plurality of lensed optical fibers such that the light paths of a portion of the plurality of lensed optical fibers are aligned with the light paths with at least a portion of the array of lensed optical fibers.

32. The optical device of claim 28, wherein the gripping elements are elastomeric.

* * * * *